(12) United States Patent
Chapman et al.

(10) Patent No.: US 10,904,449 B2
(45) Date of Patent: Jan. 26, 2021

(54) INTRINSIC COLOR CAMERA

(71) Applicant: Disney Enterprises, Inc., Burbank, CA (US)

(72) Inventors: Steven Chapman, Burbank, CA (US); Mehul Patel, Burbank, CA (US); Joseph Popp, Burbank, CA (US); Calis Agyemang, Burbank, CA (US); Joseph Hager, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 147 days.

(21) Appl. No.: 15/664,979

(22) Filed: Jul. 31, 2017

(65) Prior Publication Data

US 2019/0037124 A1 Jan. 31, 2019

(51) Int. Cl.
*H04N 5/235* (2006.01)
*H04N 5/225* (2006.01)
*H04N 5/232* (2006.01)

(52) U.S. Cl.
CPC ......... *H04N 5/2354* (2013.01); *H04N 5/2252* (2013.01); *H04N 5/2254* (2013.01); *H04N 5/2256* (2013.01); *H04N 5/23222* (2013.01); *H04N 5/232941* (2018.08); *H04N 5/23293* (2013.01); *H04N 5/232121* (2018.08)

(58) Field of Classification Search
CPC .. H04N 5/2354; H04N 5/2252; H04N 5/2254; H04N 5/2256
USPC ................................. 348/266, 371
See application file for complete search history.

(56) References Cited

U.S. PATENT DOCUMENTS

| | | | |
|---|---|---|---|
| 6,445,884 B1* | 9/2002 | Yahav | G01C 11/025 396/106 |
| 6,603,507 B1* | 8/2003 | Jiang | H04N 5/2256 348/216.1 |
| 7,740,371 B1* | 6/2010 | Lebens | F21L 4/027 362/205 |
| 9,230,367 B2 | 1/2016 | Stroila | |
| 9,596,395 B1* | 3/2017 | Hines | H04N 5/2256 |
| 10,137,361 B2 | 11/2018 | Perry | |
| 2007/0140678 A1* | 6/2007 | Yost | H04N 1/00183 396/147 |
| 2011/0148924 A1 | 6/2011 | Tapley | |
| 2013/0328928 A1 | 12/2013 | Yamagishi | |
| 2014/0010407 A1 | 1/2014 | Sinha | |
| 2014/0085183 A1 | 3/2014 | Na | |
| 2014/0172640 A1 | 6/2014 | Argue et al. | |
| 2014/0198192 A1 | 7/2014 | Yamamoto et al. | |
| 2014/0267399 A1 | 9/2014 | Zamer | |
| 2014/0267400 A1 | 9/2014 | Mabbutt et al. | |

(Continued)

*Primary Examiner* — Sinh Tran
*Assistant Examiner* — Zhenzhen Wu
(74) *Attorney, Agent, or Firm* — Dorsey & Whitney LLP

(57) ABSTRACT

Systems and methods described herein are directed to capturing intrinsic color images of subjects. A camera may be equipped with a light source that is coaxial to the camera's image sensor and configured to emit a pulse of light of short duration. During image capture of a subject, the camera light source may emit the pulse of light through the lens barrel of the camera and stop emission of light before the reflected light from the light source returns. Thereafter, the camera lens receives the reflected light from the light source (with the light source no longer emitting light) and charge is collected at one or more image sensor photodetector sites of the camera.

20 Claims, 6 Drawing Sheets

(56) References Cited

U.S. PATENT DOCUMENTS

| | | | |
|---|---|---|---|
| 2015/0271406 A1* | 9/2015 | Cerny | H04N 5/2258 |
| | | | 348/164 |
| 2015/0341551 A1* | 11/2015 | Perrin | H04N 5/2256 |
| | | | 348/169 |
| 2016/0004923 A1 | 1/2016 | Piekniewski et al. | |
| 2016/0117561 A1* | 4/2016 | Miyazawa | G06K 9/00805 |
| | | | 348/169 |
| 2016/0307325 A1* | 10/2016 | Wang | G06T 7/521 |
| 2016/0344965 A1* | 11/2016 | Grauer | H04N 5/353 |
| 2017/0103571 A1 | 4/2017 | Beaurepaire | |
| 2017/0213393 A1 | 7/2017 | Fedosov et al. | |
| 2017/0249021 A1 | 8/2017 | Henrique Barbosa Posta et al. | |
| 2017/0307395 A1 | 10/2017 | Kim | |
| 2017/0326726 A1 | 11/2017 | Grotmol et al. | |
| 2017/0330034 A1 | 11/2017 | Wang et al. | |
| 2018/0040162 A1 | 2/2018 | Donnelly et al. | |
| 2018/0061129 A1 | 3/2018 | Sisbot | |
| 2018/0213147 A1* | 7/2018 | Miyamoto | H04N 5/23222 |
| 2018/0284802 A1 | 10/2018 | Tsai et al. | |
| 2019/0017839 A1 | 1/2019 | Eyler et al. | |
| 2019/0037136 A1* | 1/2019 | Downing | H04N 5/23232 |
| 2020/0089331 A1* | 3/2020 | Yang | H04N 5/2353 |

\* cited by examiner

INTRINSIC COLOR CAMERA

DESCRIPTION OF THE RELATED ART

Photography refers to the practice of creating durable images by recording light using an image sensor or other means. The term "photograph" means literally "light drawing," yet one factor that is out of a photographer's control is incidental lighting from the sun or artificial sources of light. Traditionally, photographers have attempted to compensate for external light interference by using supplemental lighting or shadowing to control the received light.

BRIEF SUMMARY OF THE DISCLOSURE

Systems and methods described herein are directed to capturing intrinsic color images of subjects.

In one embodiment, a camera includes: a lens barrel including a lens; an image sensor including photosites configured to collect reflected light from a captured subject; and a light source coaxial with the image sensor, where the light source is configured to emit a pulse of light having a duration shorter than the length of time it takes to receive the reflected light from the captured subject at the lens barrel. In implementations, the light source may be integrated into a camera housing including the image sensor. In implementations, the light source is configured to emit the pulse of light through the lens barrel. The lens barrel may include a light filter, the light filter including at least one of: a polarizer, a notch filter, or a waveband filter.

In some implementations, the camera includes a distance determination device configured to determine a distance between the camera and the captured subject.

In some implementations, the camera includes multiple light sources coaxial with the image sensor, where each of the multiple coaxial light sources is configured to emit a pulse of light having a duration shorter than a length of time it takes to receive reflected light from the captured subject at the lens barrel. The multiple light sources may be integrated into the camera housing.

In some implementations, the light source is configured to emit a pulse of light having a duration shorter than the length of time it takes for the emitted light to arrive at the captured subject.

In some implementations, the camera includes circuitry for delaying charge collection at each photosite of the based on a width of the emitted pulse of light.

In some implementations, the camera includes a color filter array including multiple color filters, wherein each color filter of the multiple color filters is configured to filter a waveband of light received by one or more photosites of the image sensor.

In one embodiment, a method includes: emitting a pulse of light in the direction of an imaged subject, where the pulse of light is emitted from a light source coaxial with an image sensor of a camera; after completing emission of the pulse of light, receiving a reflection of the pulse of light from the imaged subject at a lens barrel of the camera; receiving the reflection of the pulse of light at a photosite of the image sensor to generate charge; and using the generated charge to create a digital image. In some implementations, the method further includes: prior to emitting the pulse of light, determining a distance from the camera to the imaged subject; and determining if the distance from the camera to the imaged subject is greater than a predetermined distance, and if the distance is not greater than the predetermined distance, displaying a prompt on a display of the camera to position the camera further away from the imaged subject.

In some implementations, the method further includes: driving the light source using a pulse width modulator.

As used herein to describe a light source of a camera, the term "coaxial" generally refers to a light source that is positioned in line with the optical axis of the camera's image sensor and emits light that is reflected from an imaged object's surface back into the image sensor.

As used herein to describe a user interface (UI) or graphical user interface (GUI), the term "user input" generally refers to any user action that generates data that triggers one or more actions at the UI (e.g., the selection of sun and/or sky conditions, the rendering of a three-dimensional model of a location, the selection of graphical controls, etc.). User input may include, for example, a touch user interface gesture (e.g., taps, holds, swipes, pinches, etc.), vocal input (e.g., voice commands that are digitized and translated into a corresponding action), a keyboard input (e.g., pressing a keyboard key), a mouse input (e.g., clicking and/or moving a mouse pointer), and the like. User input may include a sequence of inputs, such as a particular sequence of touch gestures, voice commands, and/or key presses. User input may select, modify, or otherwise manipulate a displayed graphical control element such as, for example, buttons, checkboxes, menus, windows, sliders, navigational control elements, and the like.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

Embodiments described herein are directed to systems and methods for capturing intrinsic color images of subjects. Highlights and shadows normally introduced by extrinsic lights are eliminated or substantially reduced by employing the techniques described herein. As described herein, a camera may be equipped with a light source that is coaxial to the camera's image sensor and configured to emit a pulse of light of short duration (e.g., on the order of nanoseconds or even shorter). During image capture of a subject, the camera light source may emit the pulse of light through the optical crossover point (i.e., lens) of the camera and stop emission of light before the reflected light from the light source returns. Thereafter, the camera lens receives the reflected light from the light source (with the light source no longer emitting light) and charge is collected at one or more image sensor photodetector sites of the camera.

By employing the techniques described herein, it may be possible to obtain an image of a subject that closely captures the internal lighting qualities of the subject's color based on the wavelengths of light that it actually reflects (referred hereinafter as an "intrinsic color image"), minimally affected by extrinsic light sources. The intrinsic color image of the subject may provide a neutral color starting point for subsequent relighting of the subject for use in applications such as image editing, video editing, augmented reality applications, virtual reality applications, and the like. For example, with an intrinsic color image of a subject, the subject may more accurately be mapped onto a new digital background environment with different lighting properties. As another example, with an intrinsic color image of an environment, it may be possible to more accurately digitally relight the environment.

Figure 1:
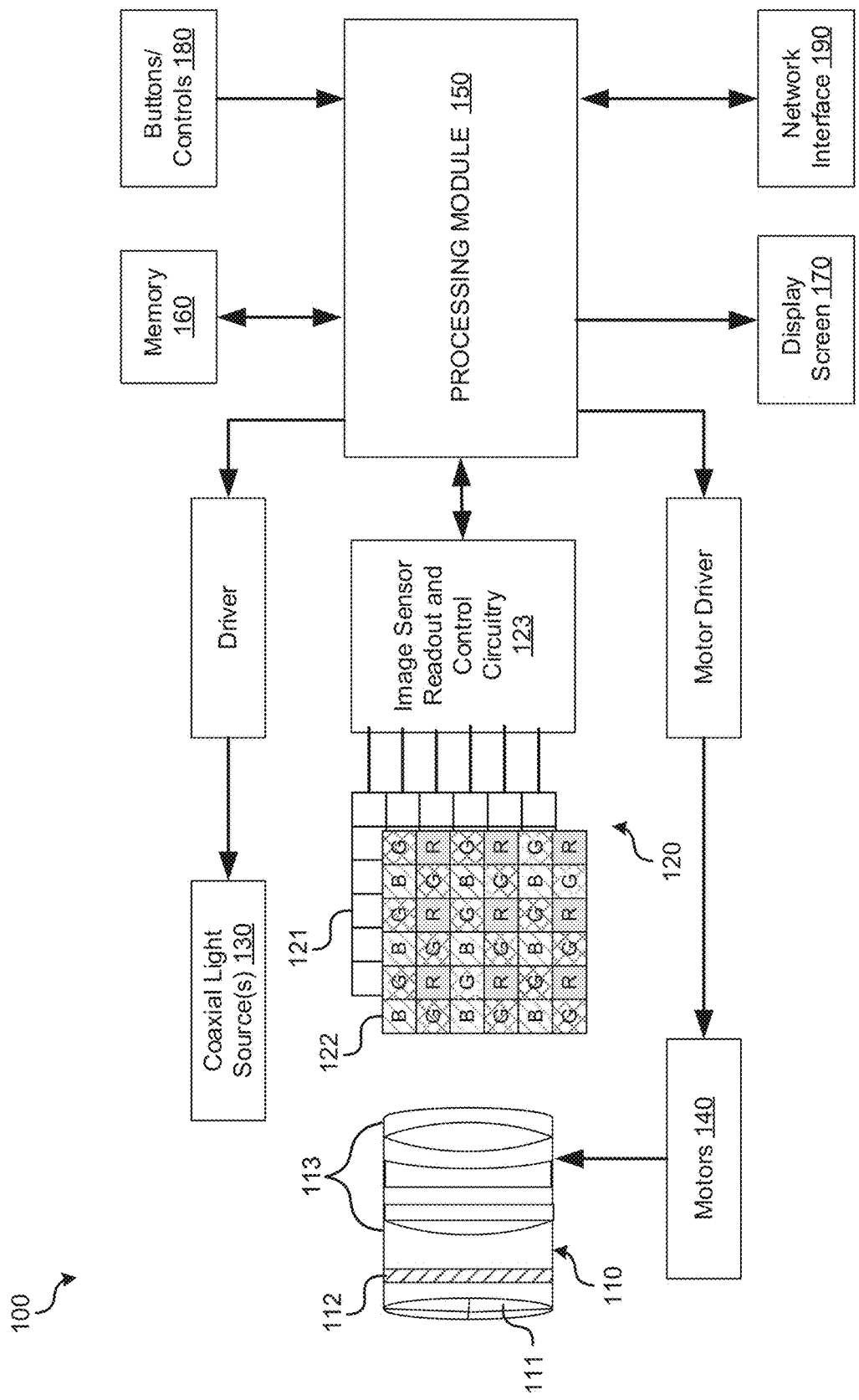
FIG. 1 is a block diagram illustrating some components of an example camera that may be implemented in embodiments to provide intrinsic color imaging of a subject.

FIG. 1 is a block diagram illustrating some components of an example camera 100 that may be implemented in embodiments to provide intrinsic color imaging of a subject. FIG. 1 will be described concurrently with FIGS. 2A-2B, which are cross-sectional diagrams illustrating example camera 100 during a light emission instant (FIG. 2A) and during a light return capture instant (FIG. 2B). As illustrated, camera 100 may include a camera lens barrel 110, an image sensor assembly 120, one or more coaxial light sources 130, motors 140 for adjusting lens barrel 110 (e.g., zoom, focus, aperture, etc.), processing module 150 for controlling various components of camera 100, memory 160, display screen 170, buttons/controls 180, and network interface 190. In some implementations, camera 100 may be a video camera.

During operation of camera 100, a user may power camera 100 and otherwise configure various parameters of camera 100 (e.g., ISO settings, f/#, white balance, zoom, focus, resolution, memory storage options, network settings, etc.) using one or more button/controls 180. Buttons/controls may include, for example, touchscreen controls, physical buttons, rotary controls, capacitive controls, and the like. Display screen 170 (e.g., an LCD screen, LED screen, OLED screen, etc.) may provide access to controls 180 and display subjects before image capture and images stored in memory 160.

Captured digital image data may be stored in memory 160, which may comprise volatile memory (e.g. RAM), non-volatile memory (e.g. flash storage), or some combination thereof. Captured image data stored in memory 160 may be transferred using a network interface 190 such as a cellular network interface or a WIFI network interface.

Camera lens barrel 110 may include a shutter 111 for controlling the amount of light that passes through the camera's aperture, one or more light filters 112, and lens assembly 113. Shutter 111 may be a leaf shutter or a focal-plane shutter. Although illustrated in this example as being positioned before lens 113, shutter 111 may be a leaf shutter fitted before, after, or within lens 113. Depending on the imaging application and needed imaging quality, lens 113 may be a replaceable lens, a digital zoom lens, an optical-zoom lens with automatic focus, or a fixed focus, fixed-zoom lens. In implementations, the lens may have different focal lengths. For example, the lens may be fisheye lens, a wide-angle lens, a standard lens, or a telephoto lens.

Light filters 112 may include a notch filter, a band-pass filter, a polarization filter, or some combination thereof for filtering out (in direction and/or wavelength) any light that may be received from external light sources such as the sun or artificial light sources. In some implementations, additional light filters 112 may be implemented in the camera housing between image sensor assembly 120 and camera lens barrel 110.

Image sensor assembly 120 includes an image sensor 121 including a plurality of photodetector sites or pixels, a color filter array (CFA) 122 including a plurality of color filters placed over the pixel sensors, and image sensor readout and control circuitry 123. As illustrated in the example of FIG. 1, CFA 122 is a Bayer color filter including alternating rows of red-green and green-blue filters. However, in other implementations, other color filter arrays may be used. For example, an RGBE filter, a CYYM filter, a CYGM filter, an RGBW Bayer, or other CFA may be used.

Depending on the implementation, image sensor 121 may be a charge coupled device (CCD), a complementary metal oxide semi-conductor (CMOS) sensor, or a FOVEON image sensor having three layers of pixels (e.g., RGB). For example, in the case of a CCD sensor, sensor 121 and circuitry 123 may include a two-dimensional array of metal-oxide semiconductor capacitors, each capacitor accumulating electric charge proportional to light intensity (e.g., number of photons) incident on a respective pixel of the image sensor, a shift register for transferring charge, a charge amplifier that converts charge into a voltage, a gain control, a pixel clock, and an analog-to-digital converter (ADC). As another example, in the case of a CMOS sensor, image sensor 121 and circuitry 123 may include circuitry for converting the charge from each photosensitive pixel of sensor 121 to a voltage at the pixel site, a multiplexer for multiplexing the signal to a digital-to-analog-converter (DAC), circuitry for selecting and resetting each pixel, and other components.

Figure 2A:
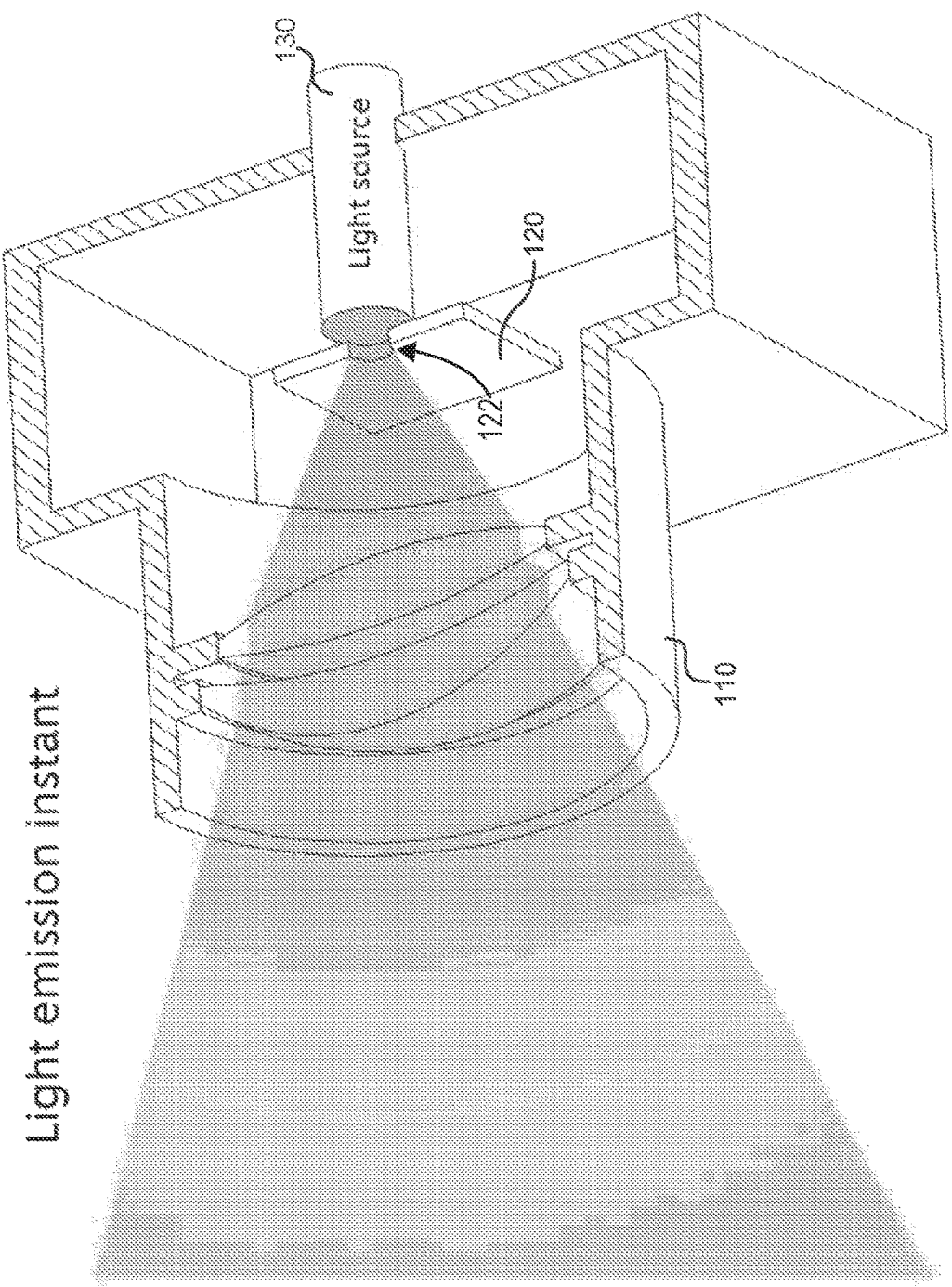
FIG. 2A is a cross-sectional diagram conceptually illustrating the camera of FIG. 1 during a light emission instant.
Figure 2B:
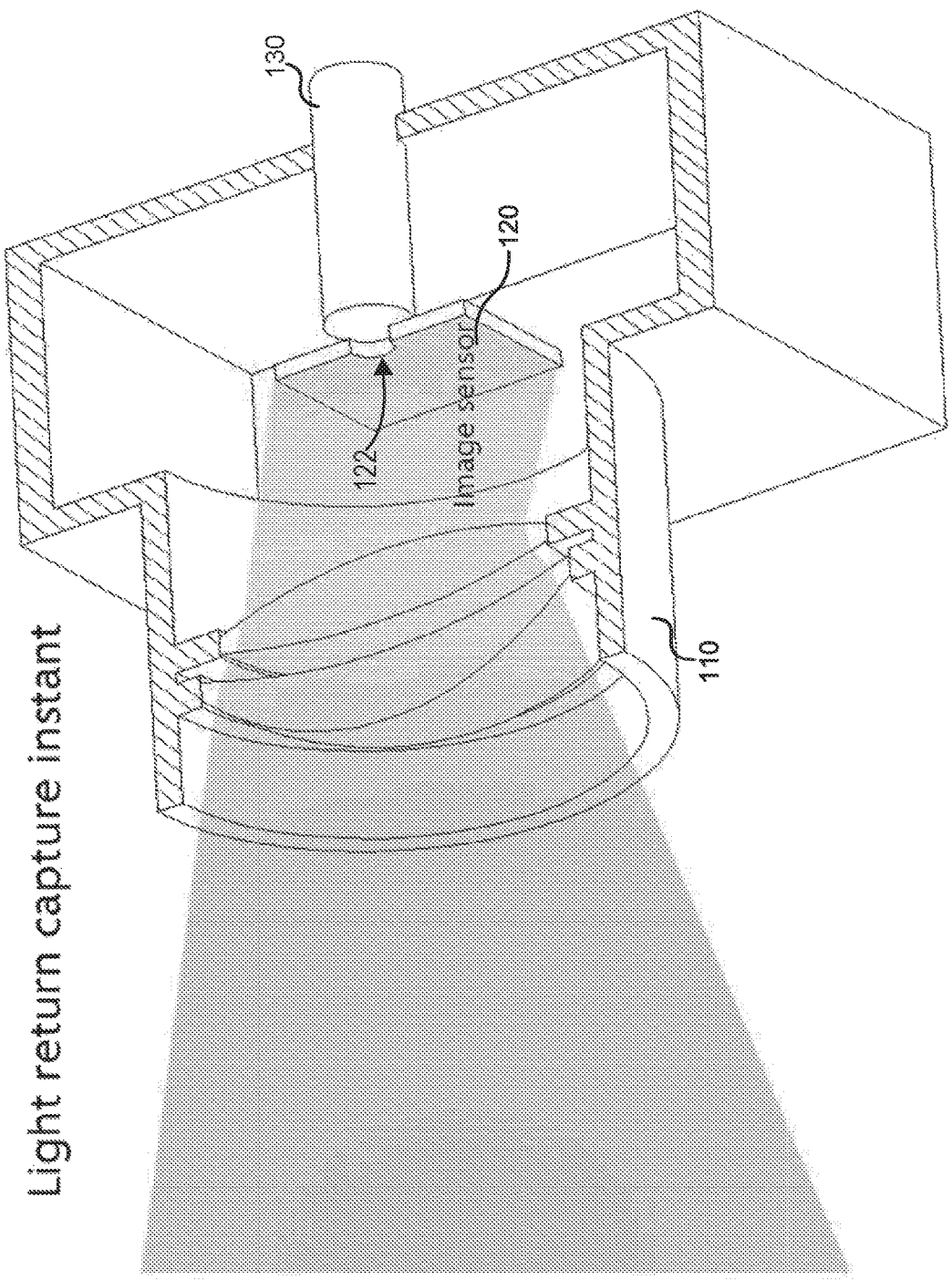
FIG. 2B is a cross-sectional diagram conceptually illustrating the camera of FIG. 1 during a light return capture instant.

With specific reference now to FIGS. 2A-2B, example camera 100 has one or more coaxial light sources 130 that are positioned in line with the optical axis of image sensor 121 and emit light that is reflected from an imaged object's surface back into the image sensor 121. As light sources 130 may emit light (FIG. 2A) and turn off that light before capture of the reflected light (FIG. 2B), light may be emitted through the optical lens barrel 110 and the reflection may be captured from lighting outside the object. As shown for example in FIGS. 2A and 2B, in some implementations, the image sensor may have an aperture 122 formed therein. One or more of the coaxial light sources 130 may be disposed behind the image sensor 120 relative to the subject and configured to emit light through the aperture 122 of the image sensor 120.

Coaxial light source(s) 130 may include or more coherent light sources (e.g., lasers) or incoherent light sources (e.g., frequency controlled light emitting diodes (LED)). Coaxial light sources 130 may be driven by one more drivers, using, for example, high speed pulse width modulation (e.g., pulses having a width of a few to tens of nanoseconds, or even less). In a particular implementation, each pixel may have a corresponding coaxial light source 130. In implementations, coaxial light sources 130 may be housed in the same housing as image sensor assembly 120 and may be configured to emit light through camera lens barrel 110.

In some implementations, imperfections in the internal optical path of camera 100 (e.g., internal reflections) that cause lighting artifacts such as flaring may be accounted for using internal baffling, non-reflective coatings, or by implementing wavelength altering materials internally in the optical path to re-release undesired photons.

In one implementation, after light emission by coaxial light source 130, a time-delay before charge collection at each pixel site may be implemented. This time delay may provide sufficient time for absorbance or release of spurious photons before capture of the reflected light. In this implementation, a minimum distance that light must travel before collection may be determined depending on the required time delay. For example, if the time delay is 20 nanoseconds, the minimum distance light must travel (e.g., the minimum distance of the subject) may be set to greater than 10 feet (e.g., greater than 20 light-feet roundtrip). In implementations, camera 100 may determine the distance to a subject by reflecting one or more light beams of a specific waveband off of the subject and calculating the amount of time that it takes to receive the reflected light. In particular implementations, infrared depth sensors, interferometers, or other devices may be integrated into the camera to measure distance to a subject. In some implementations, if the delay associated with beginning charge collection is greater than the delay associated with beginning light emission, charge collection may begin some predetermined time before light emission.

Figure 3:
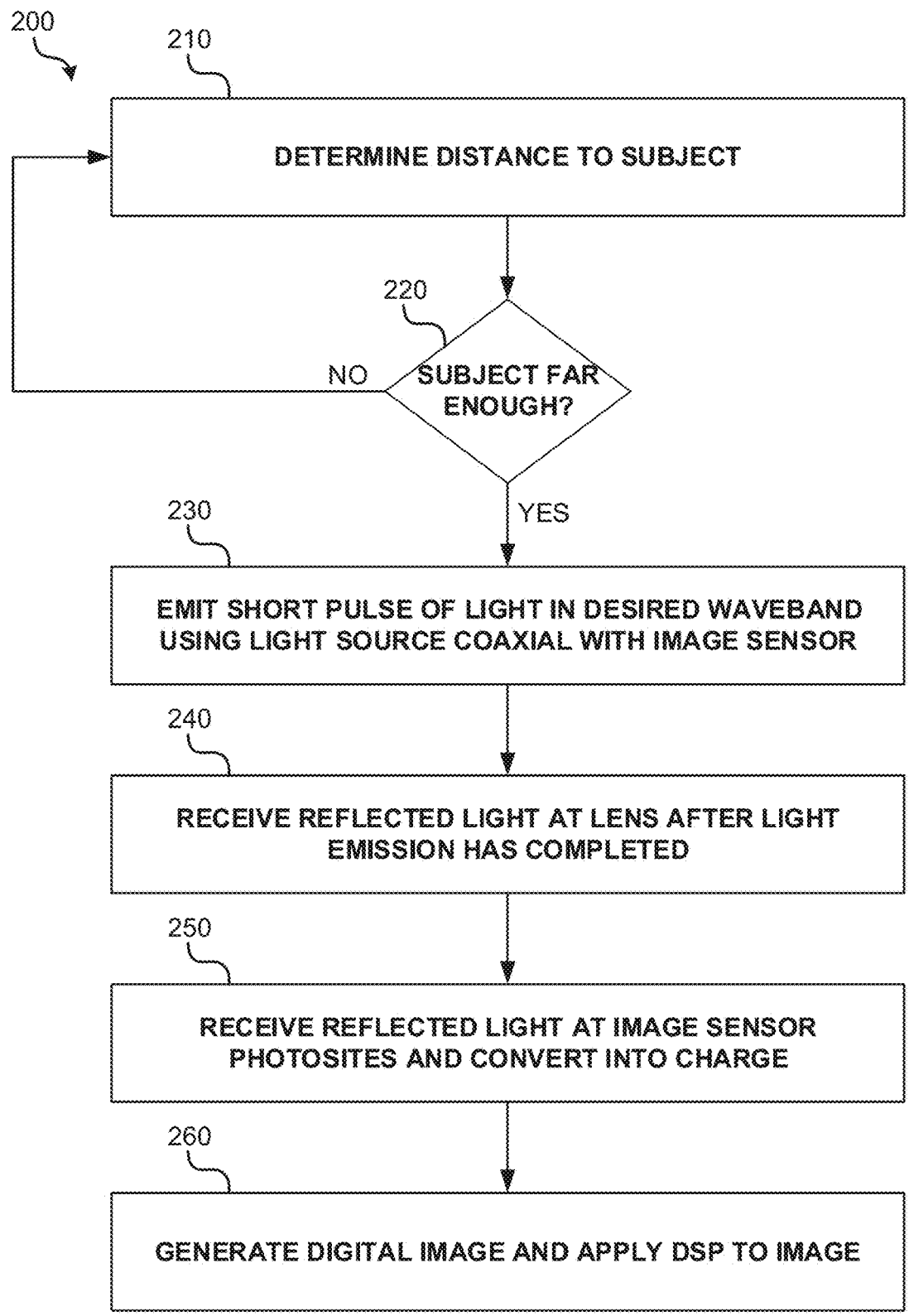
FIG. 3 is an operational flow diagram illustrating an example method of capturing an intrinsic color image of a subject that may be implemented using the camera of FIG. 1.

FIG. 3 is an operational flow diagram illustrating an example method 200 of capturing an intrinsic color image of a subject that may be implemented using, for example, camera 100. At operation 210, a distance to a subject is determined prior to capturing an image. The determined distance of the subject may be used to determine whether there is sufficient time available between the light emission instant and light capture instant to "disable" or otherwise finish emitting a light pulse from light source 130 before reflected light is received at the image sensor assembly 120. Additionally, the determined distance may be used to determine whether there is sufficient time available to otherwise absorb or release spurious photons from the light source (lighting not reflected by the subject) prior to reception of the reflected light at the image sensor assembly 120. In particular implementations, a minimum distance to a subject may be preconfigured such that a light pulse emitted from light source 130 finishes emission before it arrives at the subject. In additional implementations, the determined distance to the subject may be used during digital processing of the captured image of the subject to compensate for energy conversion artifacts and algorithmically remove their effect. For example, owing to the loss of energy as the distance to the subject increases, it may be determined that although the intrinsic color of the subject is being sensed at a closer distance a or farther distance b, the extrinsic brightness of those colors will be affected by the distance (b will return less light than a), and this distance may be accounted for to return image capture to a corrected color.

At decision 220, it is determined whether the imaged subject is at a far enough distance. For example, the determined distance to the subject may be compared with a preconfigured minimum value. In implementations, if the imaged subject is not far enough, the camera may display a prompt on display screen 170 or provide other feedback to the user that signals the user to capture the image at a greater distance. In some implementations, the minimum distance requirement may be disabled.

Figure 4:
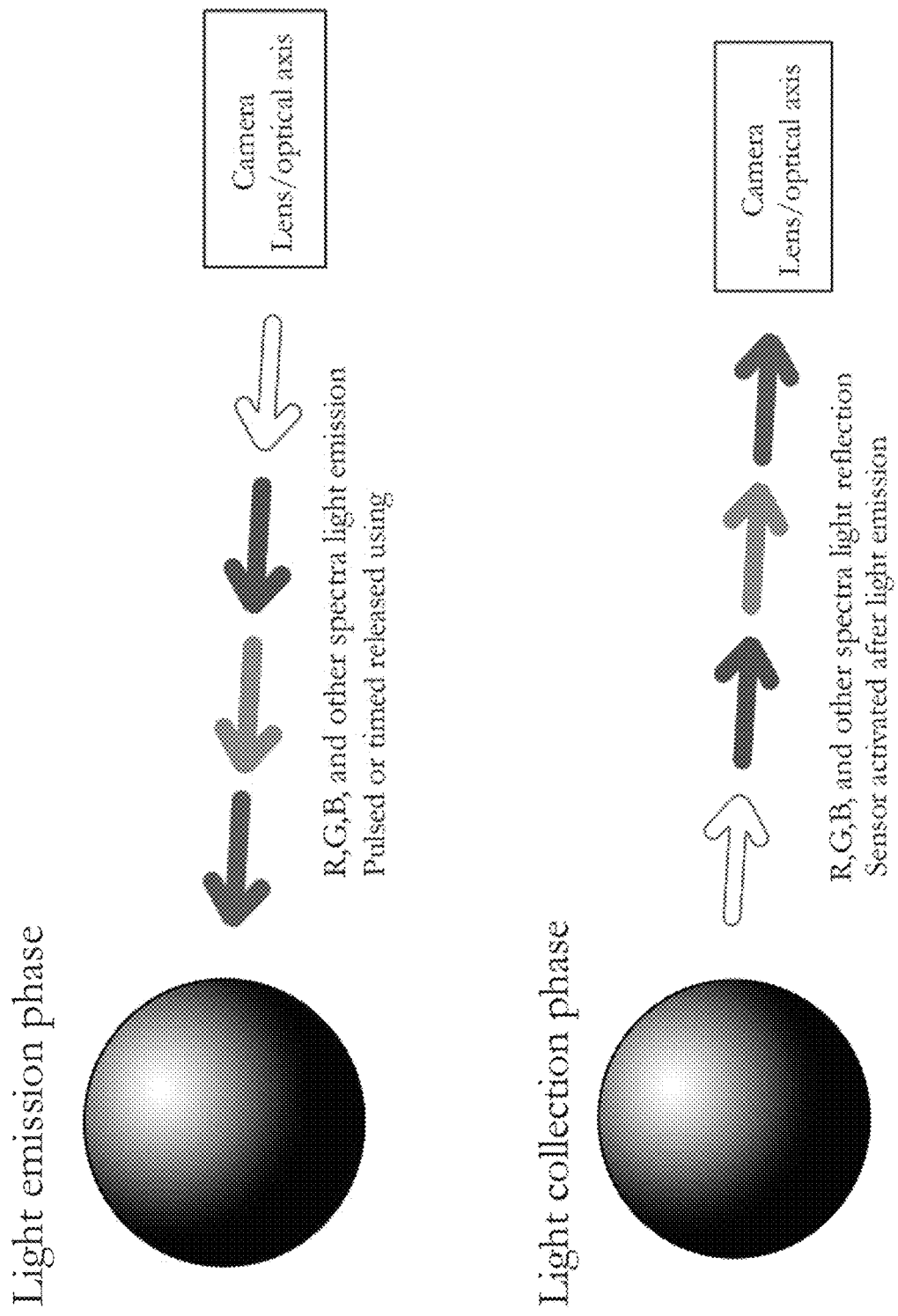
FIG. 4 conceptually illustrates an example light emission phase and example light collection phase during image capture of a subject.

At operation 230, coaxial light source 130 emits a short pulse of light in a desired waveband in the direction of the subject. In implementations, the emitted light pulse may have a pulse width on the order of nanoseconds or less. As illustrated in the example of FIGS. 2A-2B, the light may be emitted coaxial to camera lens barrel 110 (i.e., through the optics) of camera 100. In this manner, the emitted and reflected light may aligned with the optical axis of both the image sensor and camera optics. In some implementations, multiple coaxial light sources may emit corresponding pulses of light in the direction of the subject. Emission of the light pulse from the coaxial light source 130 may be time synchronized (e.g., using physical and/or electronic gates) with charge collection at image sensor assembly 120 such that the sensor is activated once emission of the light pulse is completed. In some implementations, time synchronization of light emission may be controlled using acousto-optic modulators, rotating mirrors, or hard-material shutters. FIG. 4 conceptually illustrates an example light emission phase during image capture of a subject.

In alternative implementation, instead of emitting a short pulse of light, coaxial light source 130 may provide a constant emission of light that is blocked or misdirected until the image capture instant (e.g., using mechanical or acoustic movement).

Following light emission in the direction of the subject, the subject reflects the received light, and at operation 240 the reflected light is received at a lens barrel 110 of the camera after light emission has completed (e.g., after the light pulse has completed emission from the light source). In some implementations, existing light emission or pre-imaging charge of each pixel may be blocked or dumped before the light collection of reflected light begins. In some implementations, the image sensor may be activated to collect charge after light emission and before light reflection from the imaged subject. FIG. 4 conceptually illustrates an example light collection phase during image capture of a subject. During receipt of reflected light at the camera lens barrel 110, one or more light filters 112 (e.g., polarizers, notch filters, waveband filters, etc.) may filter incoming light to ensure that external light sources are filtered out. Alternatively (or in addition), light filters may be implemented between the camera lens barrel 110 and image sensor assembly 120 assembly to distinguish the reflected light from external light sources and otherwise allow passing of light having characteristics (e.g., polarity and waveband) matching the characteristics of the emitted light.

At operation 250, the reflected light (i.e., photons) is received at the photosites (i.e., pixels) of image sensor assembly 120 and converted into charge (i.e., electrons). Following collection of the reflected light and generation of charge, at operation 260 a digital image may be generated and the camera may apply digital signal processing to the image. For example, the camera may apply a demosaicing algorithm, noise reduction, image scaling, gamma correction, colorspace conversion, and other digital image processing to the image. In implementations where the distance to the imaged subject was calculated, digital image processing may include compensation for energy conversion artifacts based on the distance to the subject as described above.

Figure 5:
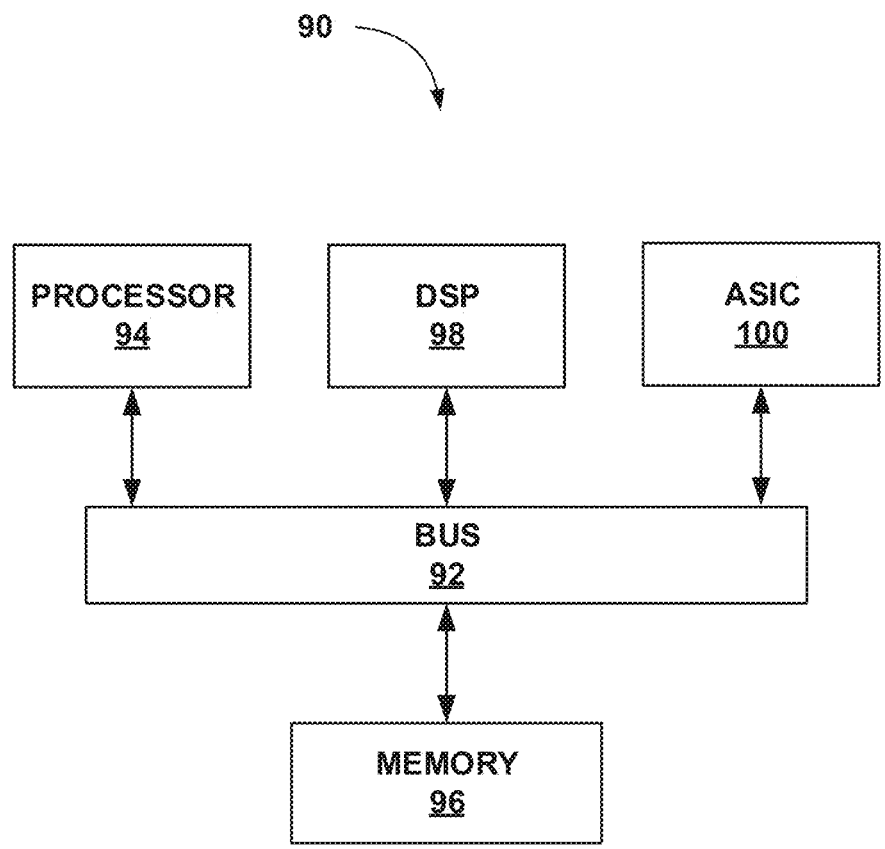
FIG. 5 illustrates a chip set/computing module in which embodiments disclosed herein may be implemented.

FIG. 5 illustrates a chip set/computing module 90 in which embodiments of the technology disclosed herein may be implemented. Chip set 90 can include, for instance, processor, memory, and additional image components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 90 includes a communication mechanism such as a bus 92 for passing information among the components of the chip set 90. A processor 94, such as an image processor has connectivity to bus 92 to execute instructions and process information stored in a memory 96. A processor may include one or more processing cores with each core configured to perform independently. Alternatively or in addition, a processor may include one or more microprocessors configured in tandem via bus 92 to enable independent execution of instructions, pipelining, and multithreading. Processor 94 may also be accompanied with one or more specialized components to perform certain processing functions and tasks such as one or more digital signal processors, e.g., DSP 98, such as an OIS DSP, image sensor, OIS gyroscope, and/or one or more application-specific integrated circuits (IC) (ASIC) 100, such as that which can be utilized to, e.g., drive a MEMS actuator for achieving OIS, zoom, and/or AF functionality. DSP 98 can typically be configured to process real-world signals (e.g., sound) in real time independently of processor 94. Similarly, ASIC 100 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The aforementioned components have connectivity to memory 96 via bus 92. Memory 96 includes both dynamic memory (e.g., RAM) and static memory (e.g., ROM) for storing executable instructions that, when executed by processor 94, DSP 98, and/or ASIC 100, perform the process of example embodiments as described herein. Memory 96 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example—computing module 90. After reading this description, it will become apparent to a person skilled in the relevant art how to implement the application using other computing modules or architectures.

In this document, the terms "computer program medium" and "computer usable medium" are used to generally refer to transitory or non-transitory media such as, for example, memory 96, or other memory/storage units. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 90 to perform features or functions of the present application as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   emitting a pulse of light through a lens of a camera from a light source in the camera, in a direction of a subject within a field of view of the lens;
   terminating an emission of the pulse of light;
   after termination of the emission of the pulse of light, receiving at an image sensor of the camera, reflected light from the subject, wherein, the image sensor includes an aperture, the light source is disposed behind the image sensor relative to the subject, the pulse of light is configured to be emitted through the aperture in the image sensor toward the subject, and the reflected light corresponds to at least a portion of the pulse of light; and
   generating an intrinsic color digital image based on the portion of the pulse of light in the reflected light describing an intrinsic color of the subject.

2. The method of claim 1 further comprising, prior to emitting the pulse of light, determining whether a distance from the camera to the subject is greater than a minimum distance necessary for terminating the emission of the pulse of light before the pulse of light arrives at the subject.

3. The method of claim 2, wherein in response to determining that the distance from the camera to the subject is less than the minimum distance, the method further comprises, displaying a prompt on a display of the camera to position the camera further away from the subject.

4. The method of claim 1, wherein the light source is integrated into a camera housing including the image sensor.

5. The method of claim 1 further comprising, after terminating the emission of the pulse of light, activating charge collection at the image sensor.

6. The method of claim 1 further comprising, emitting a plurality of pulses of light in the direction of the subject.

7. The method of claim 6, wherein the light source comprises a plurality of light sources and each of the plurality of pulses of light is emitted from a respective one of the plurality of light sources in the camera.

8. The method of claim 1 further comprising:
   passing the reflected light through a light filter of the camera; and
   removing light reflected from the subject corresponding to an external light source.

9. The method of claim 1 further comprising, driving the light source using a pulse width modulator.

10. The method of claim 1, wherein the light source is coaxial with the image sensor.

11. A camera comprising:
    a housing;
    a lens attached to the housing;
    an image sensor located within the housing having an aperture defined therein and configured to receive reflected light from a subject a light source located within the housing and positioned behind the image sensor relative to the subject and configured to:
      emit a pulse of light through the aperture in the image sensor and the lens in a direction of the subject within a field of view of the lens, and
      terminate emission of the pulse of light, wherein:
        the reflected light corresponds to at least a portion of the pulse of light, and
        the reflected light is received after termination of the emission of the pulse of light; and
    a processing element configured to generate an intrinsic color digital image based on the portion of the pulse of light in the reflected light describing an intrinsic color of the subject.

12. The camera of claim 11 further comprising, a distance determination device configured to determine a distance between the camera and the subject.

13. The camera of claim 12 further comprising, a display configured to present a prompt to position the camera further away from the subject in response to the distance determination device determining that the distance from the camera to the subject is less than a minimum distance required for terminating the emission of the pulse of light before the pulse of light arrives at the subject.

14. The camera of claim 11, wherein the light source comprises a plurality of light sources coaxial with the image sensor, wherein each of the plurality of light sources is configured to emit a pulse of light having a duration shorter than a length of time required for light to travel from the camera to the subject.

15. The camera of claim 14, wherein each of the plurality of light sources is integrated into the housing.

16. The camera of claim 11, wherein the lens includes a light filter, the light filter including a polarizer, a notch filter, or a waveband filter.

17. The camera of claim 11 further comprising, a color filter array including a plurality of color filters, wherein each color filter of the plurality of color filters is configured to filter a waveband of light received by the image sensor.

18. The camera of claim 11, wherein the light source is coaxial with the image sensor.

19. The camera of claim 11, wherein the image sensor includes one or more photosites and the light source comprises a plurality of light sources, each of the plurality of light sources corresponding to a photosite.

20. The camera of claim 19 further comprising, circuitry for delaying charge collection at each photosite of the plurality of photosites based on a duration of a respective emitted pulse of light.

* * * * *